United States Patent Office 3,444,171
Patented May 13, 1969

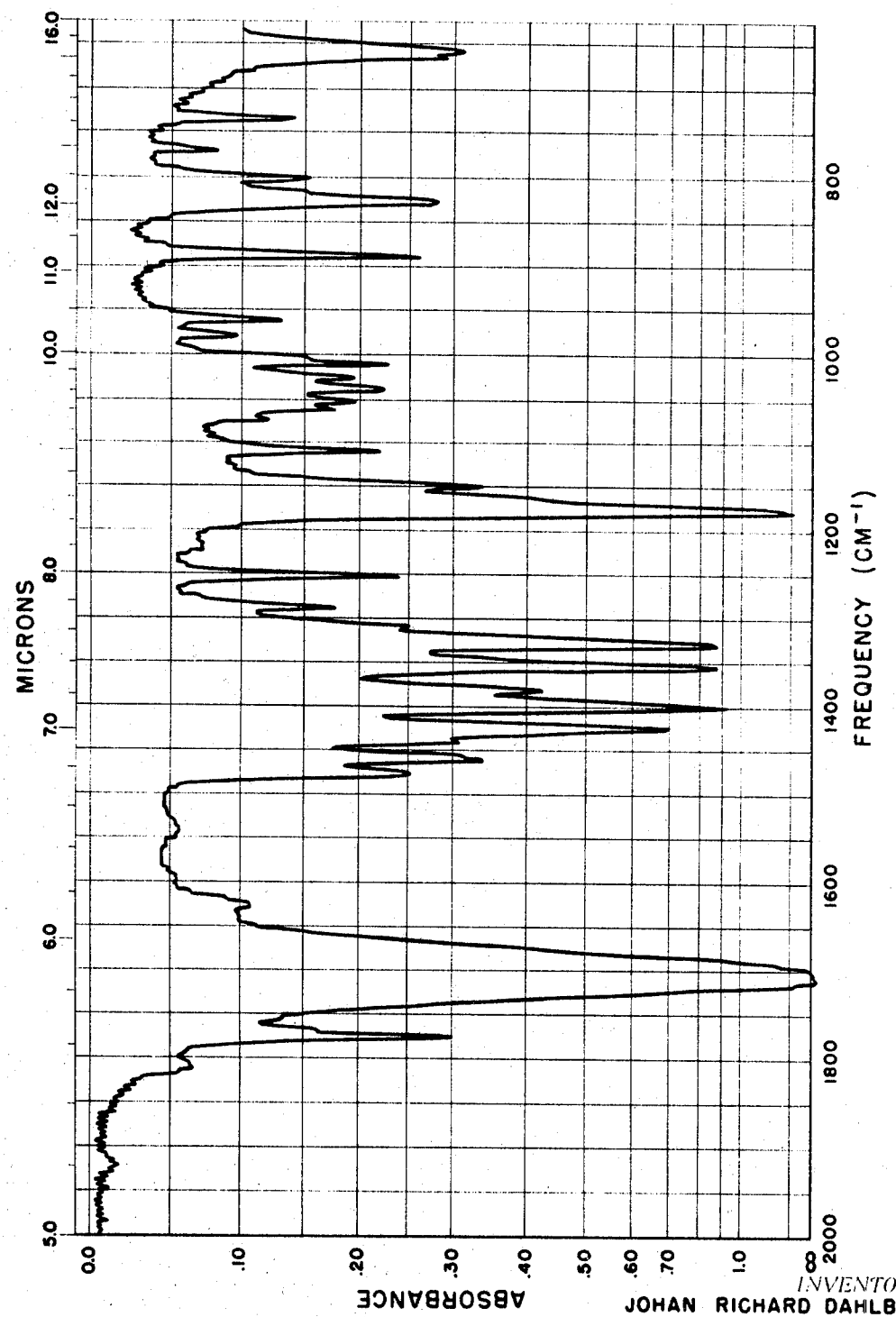
FIG. IB

3,444,171
ACETYLENIC IMIDES AND METHOD FOR
THEIR PREPARATION
Johan Richard Dahlbom, Sodertalje, and Bo Lennart
Karlen, Skarholmen, Sweden, assignors to Aktiebolaget
Astra Apothekarnes Kemiska Fabriker, Sodertalje,
Sweden, a company of Sweden
Continuation-in-part of application Ser. No. 468,110,
June 29, 1965. This application Dec. 30, 1966, Ser.
No. 606,063
Claims priority, application Sweden, July 3, 1964,
8,163/64
Int. Cl. C07d 29/28, 27/04
U.S. Cl. 260—281                                    10 Claims

ABSTRACT OF THE DISCLOSURE

A new class of amino-imide compounds is disclosed in which an imide group and an amino group are joined by a chain containing ethylenic or acetylenic unsaturation. The compounds are effective to antagonize the tremorogenic effect of oxotremorine. Methods of synthesis and evaluations of pharmacological properties are described.

Figure 1A:
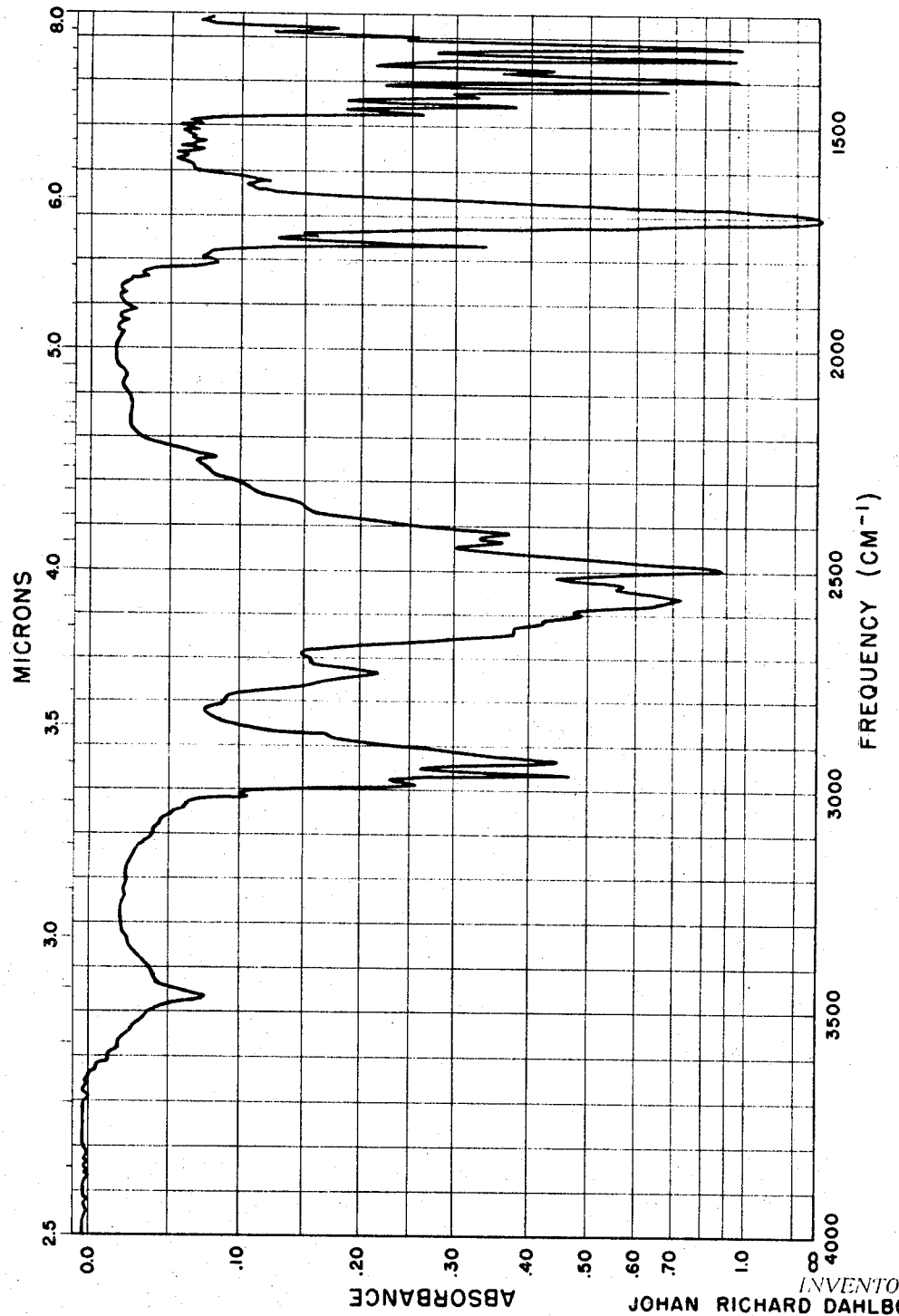

This application is a continuation-in-part of our copending application Ser. No. 468,110 filed June 29, 1965, now abandoned.

The present invention relates to new chemical compounds having valuable properties and a process for their preparation.

The compounds of the present invention are represented by the following formula:

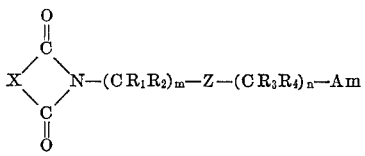

wherein X is the radical $(CHR_5)_p$, $p$ being 2 or 3, each $R_5$ being hydrogen phenyl or alkyl and X containing not more than one alkyl group, $R_1$, $R_2$, $R_3$ and $R_4$ are each hydrogen or methyl, $m$ and $n$ are each 1 to 3, Z is —C≡C— or —CH=CH—, and Am is an amino group joined to the linking chain at the nitrogen atom, the amino group being selected from the class consisting of mono- and di-alkyl amino, mono- and di-alkoxyalkyl amino, mono- and di-alkenyl amino, (alkyl, alkyloxyalkyl) amino, (alkyl, alkenyl) amino, pyrrolidino, piperidino, methyl substituted pyrrolidino and piperidino containing 1 to 3 methyl groups, and morpholino. In the foregoing, the alkyl, alkenyl and alkoxyalkyl groups, when present, have from 1 to 5 carbon atoms. The secondary amino compounds, i.e., having no hydrogen on the amino nitrogen, have at least 11 carbon atoms in the molecule.

The linking groups in the compounds of the present invention preferably have no more than 8 carbon atoms. Illustrative classes of linking groups include, but are not limited to $m$ and $n=1$, $R_1$, $R_2$, $R_3$ and $R_4=H$, Z=—C≡C—, i.e., —$CH_2$—C≡C—$CH_2$—; $m=2$ or 3, $n=1$, $R_1$, $R_2$, $R_3$ and $R_4=H$, Z=—C≡C—, i.e., —$(CH_2)_m$—C≡C—$CH_2$—; $m$ and $n=1$, $R_1=CH_3$, $R_2$, $R_3$ and $R_4=H$, Z=—C≡C—, i.e.,

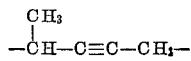

$m$ and $n=1$, $R_1$ and $R_2=CH_3$, $R_3$ and $R_4=H$, Z=—C≡C—, i.e.,

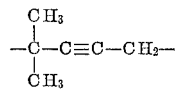

$m=1$ $n=2$, $R_1$, $R_2$, $R_3$ and $R_4=H$, Z=—C≡C—, i.e., —$CH_2$—C≡C—$(CH_2)_2$—; and $m$ and $n=1$, $R_1$, $R_2$, $R_3$ and $R_4=CH_3$, Z=—C≡C—, i.e.,

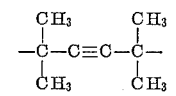

In addition, the acetylenic linkage in each of the foregoing may be replaced by an ethylenic linkage.

Typical imide ring systems are those in which X is

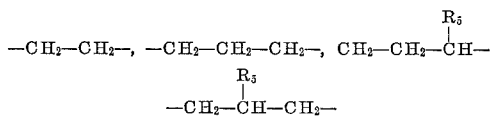

Associated with the foregoing illustrative linking groups, the preferred imide ring is either succinimide or glutarimide.

The preferred amino groups associated with the foregoing illustrative linking groups are secondary amino groups having up to 7 carbon atoms, and include (methyl, ethyl) amino, (methyl, propyl) amino, (methyl, butyl) amino, dipropyl amino, diallylamino, diisopropyl amino, pyrrolidino, piperidino, 2,5 dimethyl pyrrolidino, 2,6 dimethyl piperidino, dimethyl amino (except where the balance of the molecule contains only 8 carbon atoms) diethylamino, etc.

Illustrative compounds which may be used in the present invention are the following:

N-(4-diethylamino-2-butynyl)succinimide

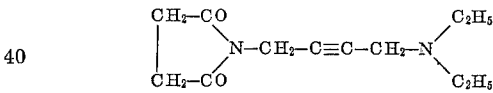

N-(4-diethylamino-2-butynyl)glutarimide

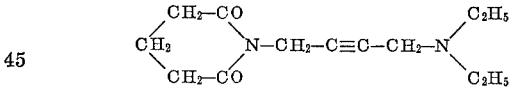

N-(4-pyrrolidino-2-butynyl)-succinimide

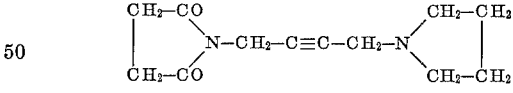

N-(4-dimethylamino-2-butynyl)-α-methylsuccinimide

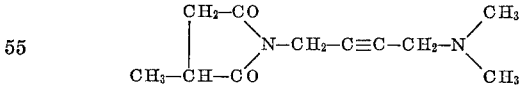

N-(4-piperidino-2-butynyl)-α-propylglutarimide

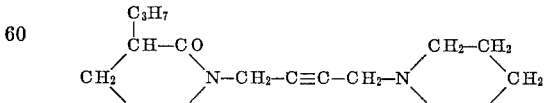

N-(4-ethylbutylamino-2-butynyl)-succinimide

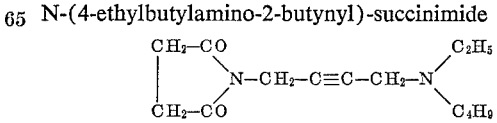

For some years tremorine, 1,4-bis-(pyrrolidino)-butyne-2, has been used to induce tremors and spasticity in several species of laboratory animals. It has recently been found that the tremoromimetic effects of tremorine are caused by the more active metabolite oxotremorine, which is 1-(2-oxopyrrolidino)-4-pyrrolidino-butyne-2. Whereas the characteristic effects of tremorine appear only after a latent period of several minutes, the active metabolite induces violent generalized tremors, spasticity, hypokinesia and para-sympathomimetic effects immediately after injection by intravenous routes. The compound thus produces both central and peripheral cholinergic reactions.

A number of drugs are known, such as atropine and caramiphen, which will antagonize the oxotremorine-induced tremor; however, they have the side effect of antagonizing the peripheral cholinergic effects of oxotremorine. The peripheral cholinergic effects are conveniently measured by observing the dilation of the pupil. Accordingly, the mydriatic effect is commonly taken as a convenient index of the extent to which a given compound will antagonize the peripheral cholinergic effects of oxotremorine. The ratio of tremorolytic activity to mydriatic activity is an index of the specificity of compounds.

The novel compounds of the present invention have been found to exhibit a high specificity as antagonists of the tremoromimetic effects of oxotremorine, i.e. they are characterized by only slight peripheral anti-cholinergic effects, as indicated by the mydriatic effect.

In order to obtain a central anti-cholinergic effect, it is necessary that the compounds of the present invention be capable of penetrating into the brain. Accordingly, when used as oxotremorine antagonists, the compounds should preferably be in the free base form. It will be obvious to those skilled in the art, however, that in the preparation of these compounds it may be convenient to prepare the non-toxic addition salts to simplify steps such as fractional crystallization. Accordingly, it will be understood that the typical addition salts are included within the present invention. Such salts include, but are not limited to hydrohalides, especially hydrochloric and hydrobromic acid, sulfuric acid, phosphoric acid, acetic acid, tartaric acid, citric acid, succinic acid, picric acid, and the natural and semi-synthetic penicillin acids of the foregoing, the hydrochloric and hydrobromic acids are preferred because of their ready availability. Manifestly, many other physiologically acceptable salts will be obvious to those skilled in the art, and all such salts may be employed in the present invention.

As is well known in the art, the tremoromimetic effect of oxotremorine has been proposed as a pharmacological model of Parkinson's disease. The fact that the compounds of the present invention have a high specificity in antagonizing the tremoromimetic effect of oxotremorine suggests, therefore, that they may also be useful in the treatment of Parkinson's disease.

Many of the compounds of the present invention may be prepared by the reaction between an acetylenic imide, formaldehyde and an amine. For convenience, the reaction is illustrated with particular reference to the preparation of butynyl compounds.

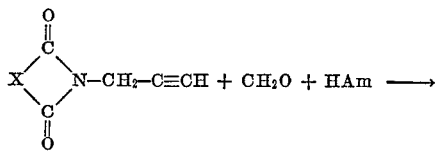

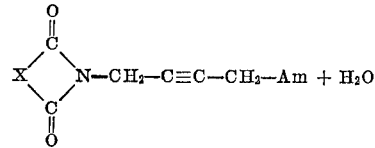

wherein X and Am are defined above. The compounds in which an ethylenic linkage replaces the acetylenic linkage may be prepared by partial hydrogenation of the latter.

Methods of preparing compounds not accessible by the foregoing procedures will be apparent to those skilled in the art. Some of these alternative methods are illustrated in the following examples.

Figure 2B:
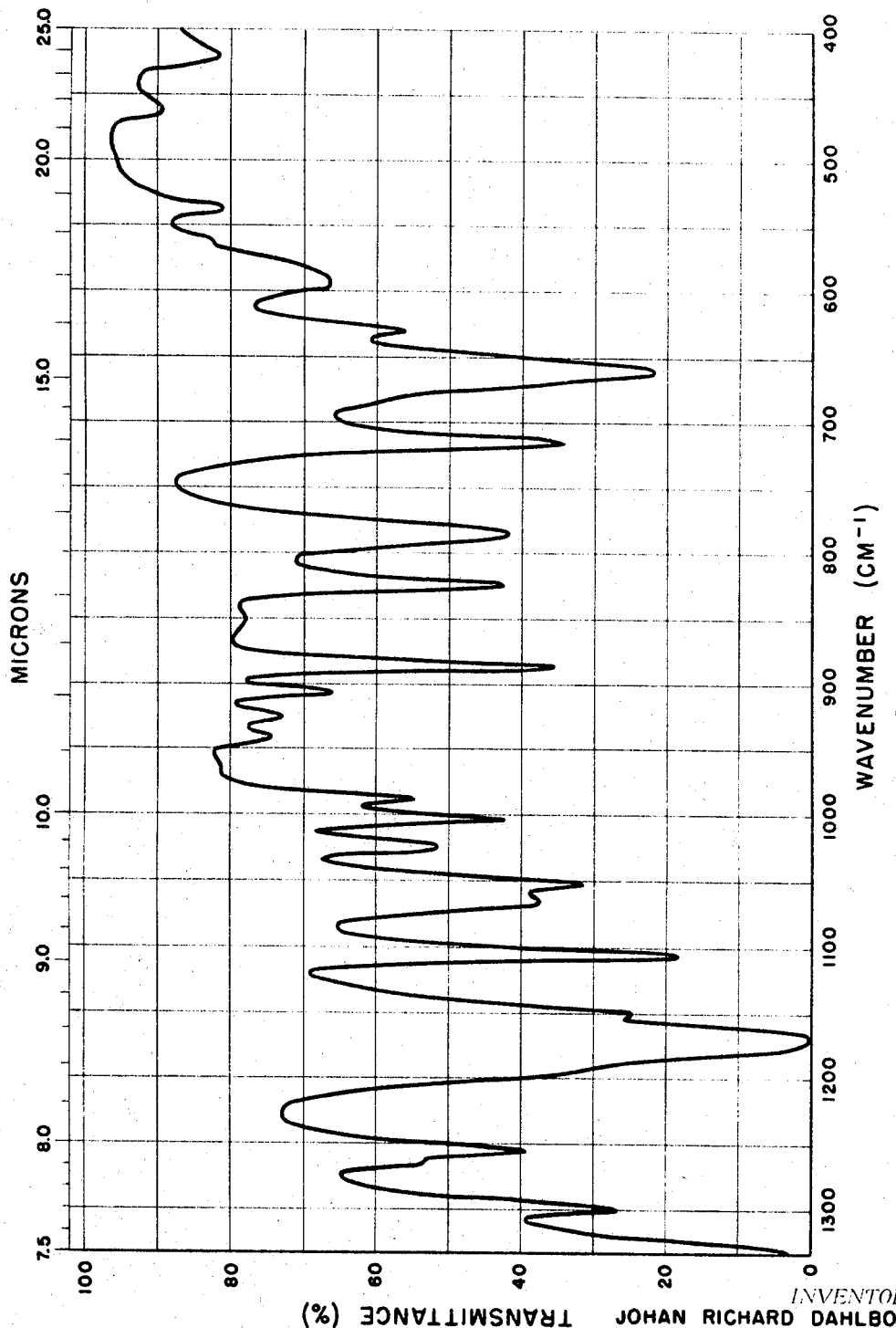
Figure 2A:
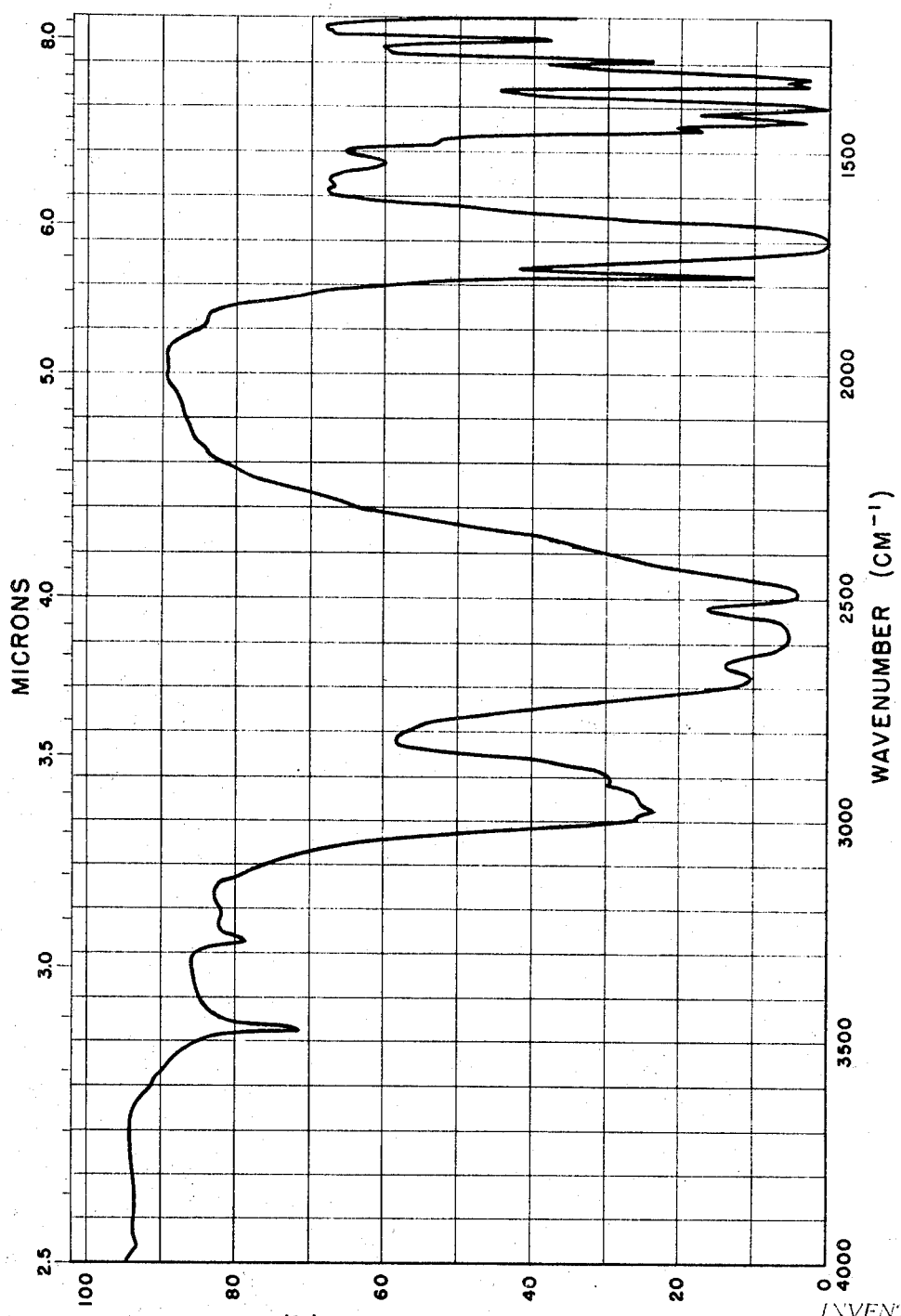

The following examples will further illustrate various specific embodiments of the present invention without, however, limiting it thereto. In the figures:

FIGURES 1A and 1B are an infrared spectrum for the compound N-(4-diethylamino-2-butynyl)-succinimide hydrochloride whose preparation is illustrated in Example 1; and FIGURES 2A and 2B are an infrared spectrum for the compound N-(4-pyrrolidino-2-cis-butenyl) succinimide hydrochloride, whose preparation is illustrated in Example 5.

Example 1.—Preparation of N-(4-diethylamino-2-butynyl)-succinimide hydrochloride The above-captioned compound is prepared in two steps from propargylbromide, succinimide, diethylamine, and formaldehyde as follows:

(1) To a solution of 23 g. of sodium in 900 ml. of absolute ethanol were added 99 g. of succinimide. When this had dissolved, 119 g. of propargylbromide was added. The mixture was refluxed for 15 hours, and the sodium bromide which precipitated was filtered off. The filtrate was evaporated under vacuum.

The residue which was obtained consisted of a slightly yellow colored oil. This was further purified by vacuum distillation, whereby N-propargyl succinimide was obtained boiling at 120° C. at 1 mm. Hg, and solidifying into crystals having a melting point of 51–52° C. The yield of N-propargylsuccinimide was 85%.

(2) A mixture of 65.5 of the N-propargylsuccinimide thus prepared, 40.2 g. of diethylamine, 18 g. of paraformaldehyde and 2 g. of cuprous chloride, all dissolved in 75 ml. of dioxane (purified by filtration through aluminum oxide) was refluxed under a nitrogen atmosphere for a period of 4 hours. The solution was filtered and then evaporated under vacuum.

The residue was diluted with 100 ml. of water, and the resulting solution was acidified by the addition of 5 N hydrochloric acid. The water phase was separated and washed twice with 100 ml. of ether. Finally, the aqueous phase was made alkaline by the addition of 5 N sodium hydroxide, whereby the free base was liberated.

The free base is moderately soluble in water. Accordingly, it was isolated by extracting the water phase six times with 50 ml. of chloroform. After drying the chloroform extract over calcium sulphate, the extract was converted to the hydrochloride by bubbling dry hydrogen chloride through the chloroform extract. The hydrochloride of N-(4-diethylamino-2-butynyl)-succinimide was precipitated as an oil, which soon solidified, and was further purified by recrystallization.

The product exhibited a melting point of 183–184° C. The yield was 48 grams.

The structure assigned to this compound

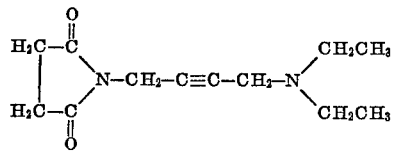

was verified by an infrared analysis of its hydrochloride, the spectrum being reproduced in FIGURES 1A and 1B.

In addition to infrared analysis, a nuclear magnetic resonance spectrum for the hydrochloride was ascertained. The following significant peaks were observed:

(a) A triplet at 1.30δ, having a coupling constant, J, of 7.0 cycles per second.—The area under the triplet indicated the presence of 6 hydrogens. This triplet confirmed the presence of two $CH_3$ groups in the amino moiety.

(b) A quartet at 3.31δ having a J of 7.0 c.p.s.—The area under the quartet indicated the presence of four hydrogens. This confirmed the presence of the two $CH_2$ groups in the amino moiety.

(c) A singlet at 2.83δ.—The area under the singlet indicated the presence of 4 hydrogens. The singlet confirmed the presence of two $CH_2$ groups in the amino the succinimide ring.

(d) A triplet at 4.05δ having a J of 1.5 c.s.p.—The area under the triplet indicated the presence of two hydrogens. This confirmed the presence of the methylene group adjacent the succinimide nitrogen.

(e) A triplet at 4.37δ, having a J of 1.5 c.p.s.—Its area corresponded to two hydrogens. This triplet confirmed the presence of the methylene group adjacent the diethyl amino nitrogen.

Example 2.—Preparation of N-(4-pyrrolidino-2-butynyl)-succinimide

The above captioned compound was prepared according to the method outlined in Example 1. The starting materials were N-propargyl-succinimide, paraformaldehyde and pyrrolidine.

When isolating the base, ether was used for extraction of the end product in place of chloroform. The product was obtained as colorless crystals having a melting point of 91–92° C.

In an analogous manner, N-(4-piperidino-2-butynyl)-succinimide can be prepared. After recrystallization from absolute estanol-petroleum ether, it has a melting point of 76–77° C.

Example 3.—Preparation of N-(4-diethylamino-2-butynyl)glutarimide (1) A solution of 11.3 g. of glutarimide dissolved in 35 ml. of dimethylformamide was added dropwise to a suspension of 2.4 g. of sodium hydride in 30 ml. of dimethylformamide. The suspension was stirred continuously during the addition of the glutarimide, and the reaction was carried out under a nitrogen atmosphere. The mixture was heated slightly to induce the reaction which starts with the evolution of hydrogen gas. After the glutarimide had been added, the mixture was heated at 100° C. for four hours.

Subsequently, 14.3 g. of propargyl bromide was added dropwise to the reaction mixture. Stirring, without heating, was continued for an additional hour. After the reaction was completed, ether was added to precipitate the sodium bromide by-product. The precipitated salt was filtered off and the filtrate was dried under vacuum.

The solid was purified by distillation, and a colorless liquid having a boiling point of 113–116° C. at 0.5 mm. of Hg was obtained. The liquid crystallized upon cooling. The solid was recrystallized from ether-petroleum ether mixture and characterized by a melting point of 41°–42° C. The yield of N-propargyl glutarimide was 10.0 g.

(2) 9.5 g. of the N-propargyl glutarimide, 7.1 ml. of diethylamine, 2.25 g. of paraformaldehyde and 0.1 gm. of cuprous chloride were dissolved in 25 ml. of dioxane, and the mixture was refluxed for 1 hour. After filtration, the solution was evaporated under vacuum and the residue was distilled.

9.6 g. of N-(4-diethylamino-2-butynyl) glutarimide having a boiling point of 165° C. at 1 mm. Hg were obtained.

As previously indicated, the compounds of the present invention containing an ethylenic linkage may be prepared by the hydrogenation of the corresponding acetylenic compounds. The cis isomer of the ethylenic compound is obtained.

Hydrogenation is carried out at room temperature and pressure in the presence of Lindlar's catalyst (10% by weight of the acetylenic compound) poisoned with a few drops of quinoline. Lindlar's catalyst is palladium supported on calcium carbonate which has been partially inactivated with lead acetate. (It is more fully described in the text Advanced Organic Chemistry by Fieser and Fieser, 1961, edition, page 229.) Ethyl alcohol is a suitable solvent for the reaction.

Example 4

A series of N(dialkylaminoalkynyl)-succinimides (0.05 mole) were hydrogenated according to the foregoing procedure until 0.05 mole of hydrogen had been taken up. The catalyst was filtered off and the filtrate was evaporated to dryness. The residue was dissolved in anhydrous ether and the salt of the resulting amine was precipitated by addition of the corresponding acid dissolved in ether. The results were as follows:

TABLE I

| Example | Starting Material | Product | M.P. |
|---------|-------------------|---------|------|
| 4 | N-(4-diethylamino-2-butynyl)-succinimide. | N-(4-diethylamino-2-cis-butenyl) succinimide oxalate. | Recrystallized from ethanol-ether M.P. =105°–106° C. |
| 5 | N-(4-pyrrolidino-2-butynyl)-succinimide. | N-(pyrrolidino-2-cis-butenyl)succinimide hydrochloride.[1] | Recrystallized from ethanol ether M.P.=167°–168° C. |
| 6 | N-(4-piperidino-2-butynyl)-succinimide. | N-(4-piperidino-2-cis-butenyl) succinimide hydrochloride. | Recrystallized from ethanol ether M.P.=75°–177° C. |
| 7 | N-(5-diethyl-amino-3-pentynyl)-succinimide (see Example 14). | N-(5-diethylamino-3-cis-pentenyl) succinimide hydrochloride.[2] | Recrystallized from dry acetone M.P.=139° C. |
| 8 | N-(1,1-dimethyl-4-pyrrolidino-2-butynyl)-succinimide (see Example 19). | N-(1,1 dimethyl-4-pyrrolidino-2-cis-butenyl) succinimide [3] hydrochloride. | Recrystallized from ethanol ether M.P.=151°–152° C. |

[1] The assigned structure,

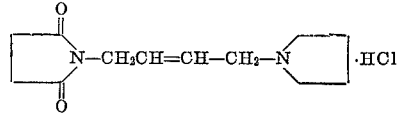

was verified by infrared analysis. The spectrum for this compound is reproduced in FIGURES 2A and 2B.

[2] The assigned structure,

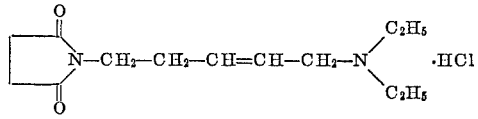

was verified by infrared analysis.

[3] The assigned structure,

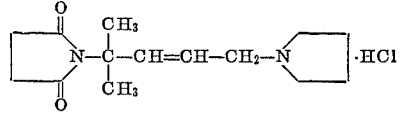

was verified by infrared analysis.

Examples 9 to 11

A series of N-1-methyl-4-amino-2-butynyl) succinimides was prepared from 3-amino-1-butyne, succinic anhydride, formaldehyde and an amino according to the following general procedure:

(1) 3-amino-1-butyne was prepared according to Hennion and DiGiovanna, J. Org. Chem. 30, 2645 (1965) from 1-methyl-2-propynyl tosylate (Marszak-Fluery, Ann. Chim. 1958, 656) and NaNH$_2$ in liquid NH$_3$.

(2) Succinic anhydride (14 g., 0.14 mole) was dissolved in 30 ml. of acetone. While refluxing, a solution of 3-amino-1-butyne (9.6 g., 0.14 mole) in 20 ml. acetone was added dropwise. Refluxing was contained for another hour after completed addition. The reaction mixture was evaporated in vacuo to a small volume from which the product, N-(1-methyl-2-propynyl)-succinamic acid, crystallized. After separation and recrystallization from benzene the compound melted at 111–3°.

(3) N-(1-methyl-2-propynyl)-succinamic acid (21 g., 0.124 mole), sodium acetate (10 g.) and acetic anhydride (50 ml.) were refluxed for one hour with stirring. Ice water (150 ml.) was added to hydrolyse the excess anhydride. After two hours the reaction mixture was neutralized with solid K$_2$CO$_3$. The reaction product, N-(1-methyl-2-propynyl)-succinimide, was extracted six times with 50 ml. portions of ether. The extract was dried overnight (K$_2$CO$_3$) and evaporated in vacuo to a small volume from which crystals were obtained, M.P. 76–8° C.

(4) N-(1-methyl-2-propynyl)-succinimide (5 g., 0.031 mole), paraformaldehyde (1.1 g., 0.037 mole) and Cu(I)Cl (0.6 g.) were dissolved and dispersed in 10 ml. of dioxane which had been purified by passing it through an Al$_2$O$_3$ column. Acetic acid (3.5 ml., 0.062 mole) and a secondary amine (0.034 mole) were added and the reaction mixture was heated to 100° C. with stirring on a water bath for 2 hours. It was then cooled, diluted with 100 ml. of water, acidified with 5 N HCl and washed twice with 50 ml. of ether. The water phase was made alkaline with 2 M Na$_2$CO$_3$ and extracted six times with 50 ml. portions of chloroform. The chloroform extract was dried (K$_2$CO$_3$) was evaporated in vacuo. Anhydrous ether (100 ml.) was added and the evaporation repeated to dryness. The residue was purified by passing through an Al$_2$O$_3$ column and eluting with ether. From the eluate the hydrochloride was precipitated by the addition of a saturated ethereal HCl solution.

Thus were obtained the following:

Example 9

N-(1-methyl - 4 - diethylamino-2-butynyl)-succinimide hydrochloride which was recrystallized from ethanol-ether, M.P. 155.5–7°. The assigned structure

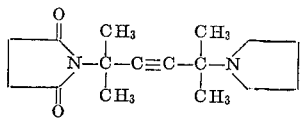

was verified by infrared analysis.

Example 10

N-(1-methyl-4-piperidino-2-butynyl) - succinimide hydrochloride which was recrystallized from acetone-ether, M.P. 144–5°.

Example 11

N-[1-methyl-4-(2′,5′-dimethylpyrrolidino) - 2 - butynyl]-succinimide which was recrystallized from acetone-ether, M.P. 155–6°.

Example 12

N-(4-pyrrolidino-1,1,4,4-tetramethyl - 2 - butynyl)-succinimide was prepared according to the following procedure:

(1) N-isopropylidenepyrrolidinium perchlorate was prepared according to N. J. Leonard and J. V. Paukstelis, J. Org. Chem., 28, 3021 (1963).

(2) An ether solution (150 ml.) of the Grignard reagent, ethylmagnesium bromide, was prepared from ethyl bromide, (12.8 gm., 0.12 mole) and magnesium (2.93 gm., 0.12 mole).

(3) A solution of 3-amino-3-methyl-butyne (7.2 g., 0.088 mole) in 50 ml. of anhydrous ether was added dropwise to the Grignard reagent with stirring. After the evolution of ethane had subsided, stirring was continued for 30 minutes and the N-isopropylidenepyrrolidinium perchlorate (18.8 g., 0.088 mole) was added in portions. The solution turned yellow and a yellow, sticky precipitate separated. After 2 hours, 2 M Na$_2$CO$_3$ (100 ml.) was added dropwise, and the ether phase was separated. The water phase was extracted four times with 50 ml. of chloroform. The combined ether and chloroform extracts were dried (K$_2$CO$_3$) and evaporated to dryness. The residue, 2-amino-2,5-dimethyl-5-pyrrolidino-3-hexyne, was distilled, B.P. 92°/3 mm.

(4) N-(4-pyrrolidino-1,1,4,4-tetramethyl - 2 - butynyl)-succinamic acid was prepared from 2-amino-2, 5-dimethyl-5-pyrrolidino-3-hexyne and succinic anhydride analogously to N-(1-methyl-2-propynyl)-succinamic acid (see Examples 9–11 above). The acid precipitated immediately on addition of the amine to the warm acetone solution. M.P. 172–4° (decomp.).

(5) N-(4-pyrrolidino - 1,1,4,4 - tetramethyl-2-butynyl)-succinimide was prepared by ring closure from N-(4-pyrrolidino-1,1,4,4-tetramethyl-2-butynyl) - succinamic acid in the same manner as N-(1-methyl-2-propynyl)-succinimide. The acid water phase was made alkaline with solid Na$_2$CO$_3$ and extracted four times with 50 ml. portions of chloroform. The chloroform extract was dried (K$_2$CO$_3$) and evaporated in vacuo. The product crystallized on cooling. It was redissolved, and the solution chromatographed on an Al$_2$O$_3$ column. From the ether eluate, the base crystallized on concentration of the solution; M.P. 53.5°–4° C. The assigned structure,

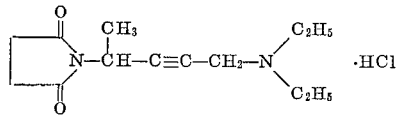

was verified by infrared analysis.

Example 13

N-(5-diethylamino-2-pentynyl)-succinimide was prepared according to the following procedure:

(1) Small pieces of sodium (9.7 g., 0.42 mole) were added slowly to liquid ammonia (1.5 l.). Propargylamine hydrochloride (18.3 g., 0.2 mole) was added and was left to react for 2 hours. Diethylaminoethyl bromide hydrobromide (26.1 g., 0.1 mole) was added in portions, and the mixture was stirred for 3 hours. After addition of anhydrous ether (400 ml.) and ammonium chloride (0.02 mole), the mixture was left overnight to let the ammonia escape. After stirring up the mixture for 30 minutes, the ether was decanted from the amine-salts. The latter were washed three times with 100 ml. portions of ether and the combined ether solutions were dried and the ether evaporated. Unreacted propargylamine was distilled off (B.P. 83°) and the residue, 5-diethylamine-2-pentynyl amine, was distilled in vacuo, B.P. 55°/0.03 mm.; $n_D^{23}$ 1.4745.

(2) N - (5 - diethylamino - 2 - pentynyl) - succinamic acid was prepared from 5-diethylamino-2-pentynylamine and succinic anhydride in acetone analogously to N-(1-methyl-2-propynyl)-succinimac acid (see Examples 9–11) and was used directly for the following preparation without further purification.

(3) N - (5 - diethylamino - 2 - pentynyl) - succinimide was prepared by ring closure of the preceding succinamic acid with acetic anhydride and sodium acetate as described previously. The reaction mixture was made alkaline and extracted with ether. The ether extract was dried, evaporated and purified on an Al$_2$O$_3$ column. The ether eluate was evaporated and the residue distilled under vacuum; B.P. 180°–185°/0.3 mm. The assigned structure,

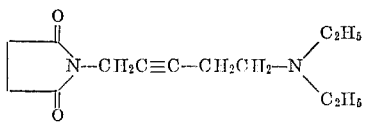

was verified by infrared analysis.

Example 14

The compound N-(5-pyrrolidino-3-pentynyl)-succinimide citrate was prepared according to the following procedure:

(1) 4-amino-1-butyne was prepared according to Dumont, Tohier and Cadiot [Compt. Rend., vol. 256, 3146 (1963)] in the following way: 1800 ml. of liquid ammonia was saturated with acetylene under anhydrous conditions (15 minutes). In preparing the acetylene-ammonia solution, the acetylene was first washed with concentrated sulfuric acid and then bubbled into the ammonia. While stirring and continuing the introduction of acetylene, a few grains of Fe(NO$_3$)$_3$ were added to the ammonia. 50.5 g. (2.2 moles) of sodium divided in small pieces was added over a period of one hour. Acetylene was passed into the reaction mixture for another 20–25 minutes. Thereafter 204.9 g. (1.0 mole) of anhydrous 2-bromoethylamine hydrobromide were added (Schuchhardt) [references for preparation: Cortese, Org. Synth. Coll., vol. II, 91 (1943); Masters and Bogert, J. Am. Chem. Soc., vol. 64, 2710 (1942); Leffler and Adams, J. Am. Chem. Soc., vol. 59, 2252 (1937)]. The addition was made in small portions at intervals of a few minutes. The reaction mixture was left 2 hours at a temperature just below −35° C. A weak stream of acetylene was passed through the mixture during the whole reaction and liquid ammonia was added twice to keep the volume constant.

To neutralize unreacted sodium acetylide 11 g. (0.2 mole) of anhydrous ammonium chloride was added. Mechanical stirring was continued for 30 minutes and 200 ml. of anhydrous ether was added, following which the reaction mixture was left at room temperature overnight. Another 200 ml. of ether was added and, after stirring for 30 minutes, the mixture was filtered, the solid was washed with 200 ml. of ether, and the ether was evaporated from the filtrate. The 4-amino-1-butyne was distilled at atmospheric pressure to yield 22.5 g. (32.6%) of a colorless fraction, boiling at 98–104° (reported B.P. 99°).

(2) To 14.5 g. (0.145 mole) of succinic anhydride dissolved in 75 ml. of anhydrous acetone was added, dropwise (slowly), 10 g. (0.145 mole) of 4-amino-butyne under stirring and the mixture was refluxed for one hour. Left overnight in the refrigerator, a yield of 22.8 g. (87.1%) crystalline N-(3-butynyl)-succinamic acid, melting at 106° was filtered off. Recrystallized from benzene-acetone, a crop with the same melting point was obtained.

(3) A mixture of 18.0 g. (0.107 mole) N-(3-butynyl)-succinamic acid, 58.3 g. (0.572 mole) acetic anhydride and 5.5 g. anhydrous sodium acetate was heated with stirring to 100° for one hour. The vessel was inserted into ice and 160 ml. of ice water was added with continuous stirring for another 2.5 hours. The acetic acid was neutralized with anhydrous sodium carbonate. A yellow oil separated. The mixture was extracted with three 100 ml. portions of ether. The combined ether extracts were dried (Na$_2$SO$_4$) and the ether was evaporated. The residue, N-(3-butynyl) succinimide, was distilled, B.P. 112°/1.5 mm. Yield: 14.1 g. (87.2%) of a solidifying oil, M.P. 39°.

(4) Under stirring, 5 g. (0.033 mole) N-(3-butynyl)-succinimide, 1.2 g. (0.04 mole) formaldehyde and 0.06 g. CuCl were added to 10 ml. of peroxide-free dioxane, followed by 2.56 grams (0.036 mole) pyrrolidine. The mixture was refluxed for 2 hours. After cooling and addition of 10 ml. of water, the mixture was acidified by 5 M HCl. The acid solution was washed twice with 50 ml. of ether. The water phase was made alkaline with 2 M Na$_2$CO$_3$ under efficient cooling, and N-(5-pyrrolidino-3-pentynyl) succinimide was extracted with six 50 ml. portions of ether. (More Na$_2$CO$_3$ may be added after the first extraction if needed to maintain a pH above 7.) After drying (Na$_2$CO$_3$), the citrate was obtained by addition of a saturated solution of citric acid in ether. The salt was recrystallized from dry acetone; yield 7.6 g. (54.3%), M.P. 97–98°.

Example 15

N-(5-diethylamino-3-pentynyl(-succinimide hydrochloride was prepared in an analogous way. Yield: 82.3%. Recrystallized from ethanol and from benzene, it melted at 138.5°.

Example 16

N-(5-dimethylamino-3-pentynyl)-succinimide hydrochloride was prepared in the same way with the following deviation: two equivalents of glacial acetic acid (calculated for the used amount of N-(3-butynyl)-succinimide) were added before the addition of dimethylamine. The amine was added dropwise to a cooled (ice) dioxane solution. The mixture was stirred for 30 minutes at room temperature, refluxed for 1.5 hours, and worked up as described above. Yield 80.3%. The hydrochloride was recrystallized from anhydrous acetone and ethanol, M.P. 141–3°.

The assigned structure,

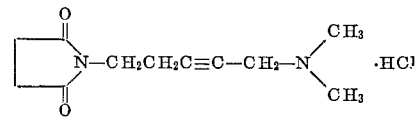

was verified by infrared analysis.

Example 17

N-(5-piperidino-3-pentynyl)-succinimide hydrochloride was prepared analogously to the pyrrolidino deriative. Yield 70.3%. Recrystallized from acetone-ethanol, it melted at 191–2°.

Example 18

The compound N-(6-diethylamino-4-hexynyl)-succinimide citrate was prepared following a procedure analogous to that described. However, instead of employing 2-bromoethylamine hydrobromide as a starting material, an equivalent amount of 3-bromopropylamine hydrobromide was substituted. The final product was obtained in a 65.1% yield. The citrate was recrystallized from acetone-ethanol and characterized by an M.P. of 101–102° C.

Example 19

N-(6-pyrrolidino-4-hexynyl)-succinimide maleate was prepared in the same manner as the previous compound. Yield 74.6%. It was recrystallized from acetone-ethanol; M.P. 109–10°. The assigned structure,

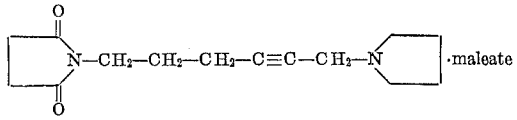

was verified by infrared analysis.

Example 20–21

N - (1,1 - dimethyl - 4 - dialkylamino - 2 - butynyl)-succinimide may be prepared in accordance with the following procedure:

(1) 3-chloro-3-methylbutyne was prepared according to Hennion and Boiselle, J. Org. Chem., vol. 26, p. 725 (1961) from 3-hydroxy-3-methylbutyne.

(2) 3-amino-2-methylbutyne was prepared according to Hannion and DiGiovanna, J. Org. Chem., vol. 30, p. 2647 (1965) from the chloro compound in liquid ammonia.

(3) N-(1,1-dimethyl-2-propynyl)-succinamic acid was prepared by dropping slowly 10 g. (0.62 mole) of 3-amino-3-methylbutyne to a refluxing solution of 12 g. (0.12 mole) succinic anhydride in 70 ml. of anhydrous acetone. After completed addition, stirring was continued for another hour, and the solution was evaporated to dryness in vacuo. The solidifying residue was recrystallized from benzene, yielding 19.6 g. (89.1%) of colorless needles melting at 119–21°.

(4) N-(1,1-dimethyl-2-propynyl)-succinimide was prepared by mixing 38 g. (0.21 mole) N-(1,1-dimethyl-2-propynyl)-succinamic acid, 100 ml. acetic anhydride, and 10 g. sodium acetate and refluxing the mixture with stirring for one hour. After cooling (by inserting the vessel in ice), 300 ml. ice water was added to the reaction mixture, and it was stirred for two hours. The mixture was neutralized with solid $K_2CO_3$ and extracted six times with 50 ml. portions of ether. The ether extract was dried ($K_2CO_3$) and concentrated to circa 20 ml. On further cooling (freezer), crystals were obtained which were recrystallized from benzene-petroleum ether; yield 27.6 g. (82%), M.P. 46–6.5°.

(5) A mixture of 0.06 mole of N-(1,1-dimethyl-2-propynyl)-succinimide, 0.066 mole of a secondary amine, 0.072 mole paraformaldehyde, 0.12 mole of acetic acid and 0.12 g. of CuCl was refluxed for 1.5 hours in 20 ml. of peroxide-free dioxane. After cooling, 100 ml. of water was added and the solution was acidified by cautious addition of 5 N hydrochloric acid. The solution was washed twice with 50 ml. of ether, made alkaline with 2 M $Na_2CO_3$ under efficient cooling and extracted with six 50 ml. portions of chloroform. The combined extracts were dried ($Na_2SO_4$) and evaporated in vacuo. The residue was dissolved in about 10 ml. of ether and the solution was passed through a neutral $Al_2O_3$ column. From the ether eluate, the hydrochloride was obtained by addition of ethereal HCl. By this procedure the following were prepared:

Example 20

N-(1,1-dimethyl-4-diethylamino-2 - butynyl) - succinimide hydrochloride. The yield was 38.4%. Recrystallized from ethanol-ether, it melted at 120–1° C.

Example 21

N-(1,1-dimethyl-4-pyrrolidino - 2 - butynyl) - succinimide hydrochloride. Yield 87%. M.P. 153–4° C. after recrystallization from ethanol-ether. The assigned structure,

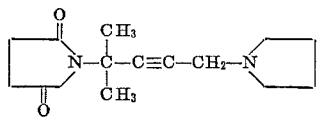

was verified by infrared analysis.

The tremorolytic effect and mydriatic effect of the compounds of the present invention are illustrated by the following tests on mice:

Example 22

Groups of 5 male mice, each weighing 18 to 22 grams, were given intraperitoneal injections of N-(4-diethylamino-2-butynyl)-succinimide in a volume not exceeding 10 ml./kg. in a series of doses increasing by a factor of 2 after each step. After 15–20 minutes pupillary diameter was measured under constant lighting conditions with the aid of a binocular microscope fitted with a calibrated eyepiece, and compared with similar measurements made immediately before injection.

Oxotremorine was then injected intravenously at a dose at 100 µg./kg. and, after a further 15–20 minute interval, the intensity of the tremor was graded visually according to the following scale:

Points
Tremors which were continuous and incapacitating ___ 4
Tremors which were intermittent, but occupied most of the time _____ 3
Tremors which were intermittent and occasional _____ 2
Tremors not occurring spontaneously but which could be provoked by restraint _____ 1
No tremors _____ 0

The results were averaged for each group of five mice and recorded.

The same experiment was repeated employing atropine, a known antagonist for oxotremorine.

The following results were obtained:

TABLE II

| | Effect of test compound | | Effect of atropine | | |
|---|---|---|---|---|---|
| Dosage level | Relative tremor response [1] | Relative pupil size | Dosage level | Relative tremor response [1] | Relative pupil size |
| 0 | 100 | 1.0 | 0 | 100 | 1.0 |
| 1.6 | 78 | 1.0 | 0.13 | 102 | 2.7 |
| 3.1 | 74 | 1.0 | 0.25 | 80 | 6.6 |
| 6.3 | 44 | 0.8 | 0.50 | 30 | 7.7 |
| 12.5 | 40 | 1.2 | 1.0 | 14 | 5.8 |
| 25 | 40 | 1.2 | 2.0 | 6 | 6.2 |
| 50 | 22 | 1.0 | | | |
| 100 | | 1.1 | | | |
| 200 | | 2.4 | | | |

[1] Relative tremor response upon intravenous injection of 100 µg./kg. of oxotremorine averaged for 5 mice. Response in the absence of a blocking agent equals 100.

The foregoing experiment was repeated to ascertain the ratio of mydriatic dose to tremorolytic dose for the test compound. The mydriatic dose is defined as the mean dose of the compound causing a two-fold increase in pupil size. The tremorolytic dose is the amount of the compound required to cause a decrease of one unit in tremor response. A ratio of 5.71 was found. The ratio of mydriatic dose to tremorolytic dose for atropine measured in the same experiment was 0.79.

The acute toxicity ($LD_{50}$) was estimated by the oral, subcutaneous, intraperitoneal and intravenous routes. For all except the intravenous routes, mortality in groups of ten mice was measured twenty-four hours after the administration of the drug. It was observed that death followed intravenous administration of the compound of the present invention almost invariably within five minutes, if it occurred at all. Accordingly, a five minute cut-off time was employed in observing mortality produced by intravenous administration. The results obtained were as follows:

TABLE III

Route of administration: $LD_{50}$
Oral _____ 800
Subcutaneous _____ 400
Intraperitoneal _____ 400
Intravenous _____ 187

Example 23

Example 22 was repeated for a series of compounds of the present invention, measurements being made of the intraperitoneal toxicity, mydriatic dose, thermorolytic dose and the ratio of the mydriatic and tremorolytic dosages. The following results were obtained:

TABLE IV.—SUMMARY OF SCREENING FOR TOXICITY AND ANTITREMOR ACTIVITY $$X\underset{\underset{O}{\overset{\overset{O}{\parallel}}{C}}}{\overset{\overset{O}{\overset{\parallel}{C}}}{\diagup}}N-(CR_1R_2)_m-Y-CH_2-Am$$

| X | $(CR_1R_2)_m$ | Y | Am | I.P. $LD_{50}$, mg./kg. | Mydriatic dose, mg./kg. | Tremorolytic dose, mg./kg. | Ratio, mydriatic/tremorolytic |
|---|---|---|---|---|---|---|---|
| $(CH_2)_2$ | $-CH_2-$ | $C\equiv C$ | $N\diagdown^{CH_3}_{C_2H_5}$ | 325 | 100 | 30 | 3.3 |
| $(CH_2)_2$ | $-CH_2-$ | $C\equiv C$ | $N\diagdown^{CH_3}_{C_3H_7}$ | 217 | 135.5 | 29.5 | 4.6 |
| $(CH_2)_2$ | $-CH_2-$ | $C\equiv C$ | $N\diagdown^{CH_3}_{C_4H_9}$ | 212 | 35.5 | 29.8 | 1.2 |
| $(CH_2)_2$ | $-CH_2-$ | $C\equiv C$ | $N(C_3H_7)_2$ | 200 | 175 | 58 | 3.0 |
| $(CH_2)_2$ | $-CH_2-$ | $C\equiv C$ | $N[CH(CH_3)_2]_2$ | | | | 1.2 |
| $(CH_2)_2$ | $-CH_2-$ | $C\equiv C$ | $N(CH_2CH=CH_2)_2$ | 225 | 51 | 100 | 0.51 |
| $(CH_2)_2$ | $-CH_2-$ | $C\equiv C$ | N⟨pyrrolidinyl⟩ | 110 | | | 0.38 |
| $(CH_2)_2$ | $-CH_2-$ | $C\equiv C$ | N⟨piperidinyl⟩ | 234 | | | 0.58 |
| $(CH_2)_2$ | $-CH_2-$ | $C\equiv C$ | N⟨2,6-dimethylpiperidinyl⟩ | | | | 1.2 |
| $(CH_2)_2$ | $\underset{CH_3}{\overset{CH_3}{C}}$ | $C\equiv C$ | $N(CH_3)_2$ | 300 | 50 | 8 | 6.3 |
| $(CH_2)_2$ | $\underset{CH_3}{\overset{CH_3}{C}}$ | $C\equiv C$ | $N(C_2H_5)_2$ | 300–400 | 9.00 | 10.00 | 0.90 |
| $(CH_2)_2$ | $\underset{CH_3}{\overset{CH_3}{C}}$ | $C\equiv C$ | N⟨pyrrolidinyl⟩ | 200 | 1.85 | 1.00 | 1.9 |
| $(CH_2)_2$ | $-CH_2-CH_2-$ | $C\equiv C$ | $N(CH_3)_2$ | >900 | 77 | 50 | 1.5 |
| $(CH_2)_2$ | $-CH_2-CH_2-$ | $C\equiv C$ | $N(C_2H_5)_2$ | 600 | 100 | 27.5 | 3.6 |
| $(CH_2)_2$ | $-CH_2-CH_2-$ | $C\equiv C$ | $N\diagdown^{CH_3}_{C_3H_7}$ | 375 | 175 | 28 | 6.2 |
| $(CH_2)_2$ | $-CH_2-CH_2-$ | $C\equiv C$ | N⟨pyrrolidinyl⟩ | 475 | 5.65 | 0.70 | 8.1 |
| $(CH_2)_2$ | $-CH_2-CH_2-$ | $C\equiv C$ | N⟨piperidinyl⟩ | 425 | 71 | 10 | 7.1 |
| $(CH_2)_2$ | $-CH_2-CH_2-CH_2-$ | $C\equiv C$ | $N(CH_3)_2$ | | 115 | 29 | 3.9 |
| $(CH_2)_2$ | $-CH_2-CH_2-CH_2-$ | $C\equiv C$ | $N(C_2H_5)_2$ | | 75 | 39.8 | 1.9 |
| $(CH_2)_2$ | $-CH_2-CH_2-CH_2$ | $C\equiv C$ | N⟨pyrrolidinyl⟩ | | (*) | 25 | (*) |
| $(CH_2)_2$ | $-CH_2-$ | $C=C$ (cis) | $N(C_2H_5)_2$ | 300 | (*) | 50 | (*) |
| $(CH_2)_2$ | $-CH_2-$ | $C\equiv C$ | N⟨pyrrolidinyl⟩ | 400 | 40 | 71 | 0.56 |
| $(CH_2)_2$ | $-CH_2-CH_2-$ | $C\equiv C$ | $N(C_2H_5)_2$ | 300–400 | 110 | 8.2 | 13 |
| $(CH_2)_3$ | $-CH_2-$ | $C\equiv C$ | $N(C_2H_5)_2$ | | | | 0.58 |

*Mydriatic effect not observed at non-toxic dose levels.

A four-week subacute toxicity study was carried out in rats. Daily doses of 50, 100 and 200 mg./kg. of N-(4-diethylamino - 2 - butynyl)succinimide were injected subcutaneously and gross, microscopic, hematological and biochemical observations were made. Minimal changes in activity were observed in a follow-up study. Other than changes of doubtful significance, no effects of treatment with N-(4-diethylamino - 2 - butynyl)succinimide were observed.

In addition, a two-week subacute toxicity study was carried out in monkeys. Three monkeys were injected subcutaneously with 20 mg./kg. once a day with N-(4-diethylamino - 2 - butynyl)succinimide and two monkeys were similarly injected twice a day. Two additional monkeys served as control. Gross, hematological and biochemical observations were made, but no positive evidence was found of any effects caused by the injection of the test compound.

It is believed that the tremoromimetic effect of oxotremorine is associated with a central cholinergic action. Compounds for antagonizing this tremor, therefore, should have central anti-cholinergic activity. As already indicated, compounds such as atropine and caramiphen are known to be effective antagonists of the oxotremorine tremor, which indicates that they have a central anti-cholinergic activity. The side effects of the known compounds, for instance, mydriasis and decreased salivation, are associated with the peripheral anti-cholinergic activity of such compounds. The fact that the compounds of the present invention antagonize the tremoromimetic effect of oxotremorine, but have only very slight side effects, indicates that they act primarily as central anti-cholinergic agents and are relatively less effective to antagonize peripheral cholinergic effects.

Further evidence of the central anticholinergic activity of the compounds of the present invention has been found in other experiments. Oxotremorine. for example, when injected into cats produces a violent rage-like state lasting from 20–40 minutes during which time the animals attack or bite any provoking object. Repeatedly hissing and growling are also consistently seen. There is a strong suggestion that hallucinatory experiences also occur. The animal's attention becomes fixed at some point in space and it becomes extremely difficult to distract. Leaping or pawing motions frequently ensue.

The injection of N - (4 - diethylamino - 2 - butynyl)-succinimide (at a dose of 100 mg./kg. intraperitoneally) into the cat prior to oxotremorine administration prevents the appearance of the rage-like state. However, the peripheral parasympathomimetic effects of oxotremorine remain unaltered (i.e., increased salivation, lacrimation, etc.).

In still another experiment, arecoline can be injected into laboratory animals. Arecoline, like oxotremorine, is capable of producing tremors by action upon the central nervous system. It has been found that N-(4-diethyl-amino-2-butynyl)-succinimide is capable of antagonizing the arecoline-induced tremor.

Evidence of the relative ineffectiveness of the compounds of the present invention as antagonists of peripheral cholinergic effects if found by comparing the ability of the compounds of this invention to antagonize the peripheral cholinergic effects of acetylcholine with the antagonism of atropine with respect to this compound. A typical peripheral cholinergic response of acetylcholine which has been studied is the effect of that compound in depressing blood pressure. This depressor activity of acetylcholine is effectively blocked by atropine which has peripheral as well as central anti-cholinergic activity. The compounds of the present invention by contrast are believed to be ineffective to antagonize the depressor action of acetylcholine. This has been observed in the case of N-(4-diethylamino-2-butynyl)-succinimide.

In addition to the foregoing, brief reference may be made to certain other pharmacological effects of the compounds of the present invention. In general, it is believed that these compounds do not have profound effects upon the cardiovascular system. This has been demonstrated in the case of N-(4-diethylamino-2-butynyl)-succinimide in studies on anesthetized cats. An interesting exception is the antagonism of N-(4-diethylamino-2-butynyl)-succinimide to the characteristic bi-phasic change in blood pressure produced by McNeil A–343 [4(m-chlorophenyl carbamoyloxy) 2-butynyl trimethylammonium chloride, which is described by A. P. Roskowski, J.P.E.T., vol. 132, pages 156–171 (1961)]. The characteristic bi-phasic change in blood pressure produced by McNeil A–343 was significantly altered by N-(4-diethylamino-2-butynyl)-succinimide at doses of as little as 5 mg./kg. The selective rise in blood pressure attributed by Roskowski to the stimulation of muscarinic receptors in sympathetic ganglia was selectively blocked by N-(4-diethylamino-2-butynyl)-succinimide leaving the subsequent fall in blood pressure uneffected.

We claim:
1. A compound selected from the group consisting of

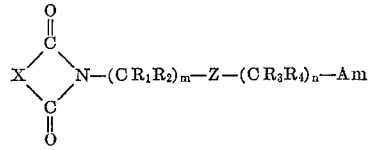

and non-toxic addition salts thereof, wherein X is $(CHR_5)_p$, $p$ being an integer from 2 to 3, each $R_5$ being selected from the class consisting of hydrogen, phenyl and alkyl and X having not more than 1 alkyl group, $R_1$, $R_2$, $R_3$ and $R_4$ are each selected from the class consisting of hydrogen and methyl, $m$ and $n$ are integers from 1 to 3, Z is a divalent radical selected from the class consisting of —C≡C—, or —CH=CH—, and Am is an amino group joined to the linking chain at the N atom, the amino group being selected from the class consisting of mono- and di-alkyl amino, mono- and di-alkoxyalkyl amino, mono- and di-alkenyl amino, (alkyl, alkyloxyalkyl) amino, (alkyl, alkenyl) amino, pyrrolidino, piperidino, methyl substituted pyrrolidino and piperidino having 1 to 3 methyl groups, and morpholino, said alkyl, alkenyl and alkoxyalkyl groups when present having from 1 to 5 carbon atoms and said compound having at least 11 carbon atoms in the molecule when said group Am is a secondary amino group.

2. A compound according to claim 1 wherein X is selected from the group consisting of

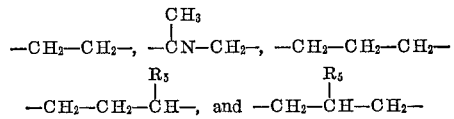

3. A compound according to claim 2 wherein the linking chain —$(CR_1R_2)_m$—Z—$(CR_3R_4)_n$— has not more than 8 carbon atoms.

4. A compound according to claim 3 wherein Am is a secondary amino group having up to 7 carbon atoms.

5. A compound according to claim 4 selected from the class consisting of N-(4-diethyl-amino-2-butynyl)-succinimide and pharmaceutically acceptable addition salts thereof.

6. A compound according to claim 4 selected from the class consisting of N-(4-pyrrolidino-2-butynyl)-succinimide and pharmaceutically acceptable additional salts thereof.

7. A compound according to claim 4 selected from the class consisting of N-(4-diethylamino-2-butynyl)-glutarimide and pharmaceutically acceptable addition salts thereof.

8. A compound according to claim 4 selected from the class consisting of N-(4-piperidino-2-butynyl)-succinimide and pharmaceutically acceptable addition salts thereof.

9. A compound according to claim 4 selected from the class consisting of N-(5-pyrrolidino-3-pentynyl)-succinimide and pharmaceutically acceptable addition salts thereof.

10. A process for the preparation of the formula

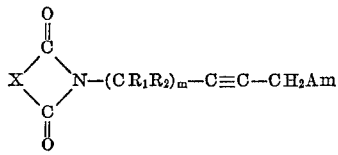

and nontoxic addition salts thereof wherein X is $(CHR_5)_p$, $p$ being an integer from 2 to 3, each $R_5$ being selected from the group consisting of hydrogen and alkyl and X having not more than 1 alkyl group, $R_1$ and $R_2$ are each selected from the group consisting of hydrogen and methyl, $m$ is an integer from 1 to 3 and Am is an amino group joined to the linking chain at the nitrogen atom, the amino group being selected from the class consisting of di-alkyl amino, di-alkoxyalkyl amino, di-alkenyl amino, (alkyl, alkyloxyalkyl) amino, (alkyl, alkenyl) amino, pyrrolidino, piperidino, methyl substituted pyrrolidino and piperidino having 1 to 3 methyl groups, and morpholino, said alkyl, alkenyl, and alkyloxyalkyl groups when present having from 1 to 5 carbon atoms, and said compound having at least 11 carbon atoms in the molecule, the system of reaction a propargyl imide of the formula

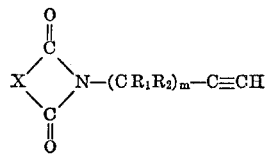

with formaldehyde and an amine of the formula HAm, $R_1$, $R_2$ and Am being as defined above.

References Cited
UNITED STATES PATENTS

| | | | |
|---|---|---|---|
| 3,017,416 | 1/1962 | Lo et al. | 260—294 X |
| 3,317,526 | 5/1967 | Dahlbom et al. | 260—326.3 |
| 3,354,178 | 11/1967 | Dickinson | 260—326 X |

ALEX MAZEL, *Primary Examiner.*

D. G. DAUS, *Assistant Examiner.*

U.S. Cl. X.R.

260—247.2, 294, 326.3, 326.5, 999

UNITED STATES PATENT OFFICE
CERTIFICATE OF CORRECTION

Patent No. 3,444,171    Dated May 13, 1969

Inventor(s) Johan Richard Dahlbom and Bo Lennart Karlen

It is certified that error appears in the above-identified patent and that said Letters Patent are hereby corrected as shown below:

Column 5, line 9, the word -- identical -- should precede "$CH_2$";

Table I, Example 5, the product should be -- N-(4-pyrrolidino-2-cis-butenyl)succinimide hydrochloride.[1] --;

Table I, Example 6, the M.P. should read -- Recrystallized from ethanol ether M.P. = 175°-177° C. --;

Column 6, line 72, following "N-" insert a parenthesis [(];

Column 10, line 16, the parenthesis [(] following "pentynyl" should be reversed [)];

Column 10, line 71, "Example" should be -- Examples --;

Table IV, in the formula heading the table, the subscript -- m -- should follow "$(CR_1R_2)$";

Table IV, in the column headed "Am", the fifth formula, the brackets should be reversed;

Column 15, line 61, change "if" to -- is --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents

Disclaimer 3,444,171.—*Johan Richard Dahlbom*, Sodertalje, and *Bo Lennart Karlen*, Skarholmen, Sweden. ACETYLENIC IMIDES AND METHOD FOR THEIR PREPARATION. Patent dated May 13, 1969. Disclaimer filed Feb. 4, 1977, by the assignee, *Aktiebolaget Astra*.

Hereby enters this disclaimer to claims 1, 2, 6 and 10 of said patent.

[*Official Gazette May 3, 1977*.]